United States Patent
Nanaumi

(10) Patent No.: US 8,570,574 B2
(45) Date of Patent: Oct. 29, 2013

(54) PROCESSING SYSTEM, CONTROL METHOD, AND STORAGE MEDIUM THEREFOR

(75) Inventor: Yoshihito Nanaumi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 140 days.

(21) Appl. No.: 13/171,285

(22) Filed: Jun. 28, 2011

(65) Prior Publication Data

US 2012/0008164 A1    Jan. 12, 2012

(30) Foreign Application Priority Data

Jul. 9, 2010    (JP) .................................. 2010-156924

(51) Int. Cl.
G06F 3/12    (2006.01)
G06K 15/00    (2006.01)
H04N 1/36    (2006.01)

(52) U.S. Cl.
USPC ........ 358/1.15; 358/1.13; 358/1.18; 358/409; 358/410

(58) Field of Classification Search
USPC ........................ 358/1.13, 1.15, 1.18, 409, 410
See application file for complete search history.

(56) References Cited

U.S. PATENT DOCUMENTS

| | | | |
|---|---|---|---|
| 6,934,044 B1 * | 8/2005 | Khandelwal | 358/1.15 |
| 7,075,670 B1 * | 7/2006 | Koga | 358/1.15 |
| 7,229,224 B2 * | 6/2007 | Toda et al. | 400/76 |
| 7,259,882 B2 * | 8/2007 | Tsuda et al. | 358/1.15 |
| 8,130,392 B2 * | 3/2012 | Kato | 358/1.15 |
| 8,395,799 B2 * | 3/2013 | Takahashi | 358/1.15 |
| 8,482,778 B2 * | 7/2013 | Towata | 358/1.15 |
| 2003/0007175 A1 * | 1/2003 | Tsuda et al. | 358/1.15 |
| 2004/0169878 A1 * | 9/2004 | Toda et al. | 358/1.13 |
| 2004/0174560 A1 * | 9/2004 | Shima | 358/1.15 |
| 2005/0162680 A1 * | 7/2005 | Sekiguchi et al. | 358/1.13 |
| 2006/0044607 A1 * | 3/2006 | Kato | 358/1.15 |

FOREIGN PATENT DOCUMENTS

JP    2003-022165 A    1/2003

* cited by examiner

*Primary Examiner* — Twyler Haskins
*Assistant Examiner* — Jonathan Beckley
(74) *Attorney, Agent, or Firm* — Canon USA, Inc., IP Division

(57) ABSTRACT

A processing system may include a server group connectable to an image forming apparatus, a request processing unit, a backend processing unit, a receiving unit, a determination unit, and a sending unit. The receiving unit receives information relating to a document file corresponding to a processing request from the image forming apparatus. If the determination unit determines that that the processing method is a synchronous processing method, then the request processing unit processes the document file based on the processing request. If the determination unit determines that that the processing method is an asynchronous processing method, then the request processing unit requests the backend processing unit to process the processing request. After the document file has been processed according to the determined processing method, the sending unit sends a notification to the image forming apparatus that the document file has been processed.

11 Claims, 12 Drawing Sheets

PROCESSING SYSTEM, CONTROL METHOD, AND STORAGE MEDIUM THEREFOR

BACKGROUND OF THE INVENTION

1. Field of the Invention

The present invention relates to a processing system, a control method, and a storage medium therefor.

2. Description of the Related Art

A content management system using a network technique has become popular. In the content management system, a user can operate content on a web page established by a server computer, via a client.

Japanese Patent Application Laid-Open No. 2003-022165 discusses a printer which acquires data from a server based on a uniform resource locator (URL) designated from a client computer and prints the acquired data.

In recent years, a technique called cloud computing has been used as a format of performing various types of processing on the side of a server computer. In a cloud computing system, data processing is performed for various document files stored in various content management systems.

SUMMARY OF THE INVENTION

According to an aspect of the present invention, a processing system including a server group connectable to an image forming apparatus includes a request processing unit configured to receive a processing request from the image forming apparatus and perform processing based on the processing request; a backend processing unit configured to perform processing based on the processing request; a receiving unit configured to receive information relating to a document file corresponding to the processing request from the image forming apparatus; a determination unit configured to determine, based on the information relating to the document file received by the receiving unit, whether a processing method is one of a synchronous processing method and an asynchronous processing method, wherein, if the determination unit determines that that the processing method is a synchronous processing method, then the request processing unit processes the document file based on the processing request and, if the determination unit determines that that the processing method is an asynchronous processing method, then the request processing unit sends a notification to the image forming apparatus that the processing request is being processed and requests the backend processing unit to process the processing request, wherein the backend processing unit processes the document file based on the processing request; and a sending unit configured to send to the image forming apparatus, after one of the request processing unit and the backend processing unit has processed the document file according to the processing method determined by the determination unit, a notification that the document file has been processed.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

In cloud computing, a user may utilize distant, shared servers for data storage and data processing, allowing the device of the user to employ smaller and more efficient chips that consume less energy than standard computers. When data processing is performed in a cloud computing system, and an application for an information processing apparatus (e.g., a web browser for a printer) acquires data that has been subjected to the data processing, a situation, described below, occurs. In the situation, a different period of time elapses until the application acquires data depending on the data to be acquired. For example, a different period of time elapses until the application acquires data from the cloud computing system depending on a storage location of the data.

As a result, an application for a printer that acquires data, if it takes much time to acquire the data, is occupied by an acquisition instruction until the data is acquired, and a screen of the application does not change. As a result, it seems to a user that the screen is frozen. An embodiment is directed to switching a processing method according to data to be processed. Thus, an appropriate cloud computing resource can be used.

Approaches for carrying out the embodiments will be described below with reference to the drawings.

Figure 1:
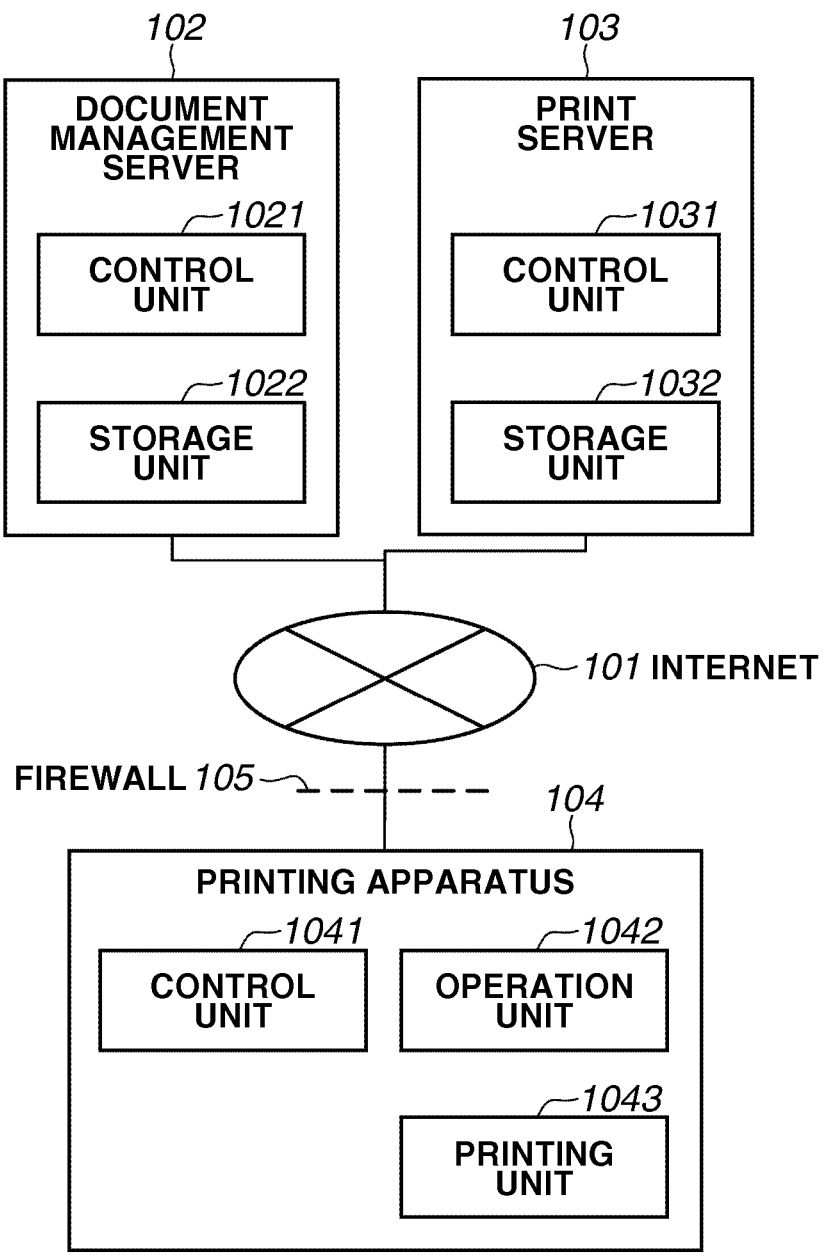
FIG. 1 illustrates a configuration of a processing system according to a first exemplary embodiment.

A system configuration of an image forming system according to a first exemplary embodiment will be first described. FIG. 1 illustrates the whole configuration of the system according to the first exemplary embodiment. The system includes an Internet 101, a print server 103, a document management server 102, a printing apparatus 104, and a firewall 105. While the print server 103 in the first exemplary embodiment includes one print server, it may include a print server group including a plurality of print servers. In that case, the print server may virtualize a plurality of information processing apparatuses and start the information processing apparatuses as if they were one computer. If such a print server assumes cloud computing, the print server may have a plurality of virtual machines generated in its own system. The print server uses the plurality of virtual machines to perform processing in parallel. The print server 103 will be referred to as a printing system in consideration of the foregoing. The printing apparatus 104 corresponds to an image forming apparatus.

The Internet 101 functions as a communication line for exchanging information among the above-mentioned devices. The communication line may be wired or wireless. Each of the devices in the image forming apparatus is connectable to the other device via the Internet 101. The print server 103 includes a control unit 1031 and a storage unit 1032. The storage unit 1032 stores print data for the print server 103 to be operated as a spooler. The control unit 1031 performs a general known function as an application server. For example, a web application for executing each processing is installed according to a processing request from a web browser 4032 (FIG. 4) in the printing apparatus 104. The web application in the print server 103 performs processing such as spool processing for converting an input document file into print data and storing the print data in a storage unit 1022, and processing for subjecting the print data stored in the storage unit 1022 to printing processing.

The document management server 102 includes a control unit 1021 and the storage unit 1022. The storage unit 1022 stores a document file. The control unit 1021 performs a generally known function as an application server. For example, a web application for executing each processing is installed in the document management server 102 according to a processing request from the web browser 4032 in the printing apparatus 104. The document management server 102 has a function of sending the document file in response to a document file acquisition request from the print server 103. The web application in the document management server 102 executes document file storage processing for the storage unit 1022, and display processing and acquisition processing of the stored document file.

The printing apparatus 104 is a multi-function peripheral (MFP) for inputting or outputting and sending and receiving a content and performing various types of image processing, and is connected to the print server 103 to receive a service. A control unit 1041 controls an operation unit 1042, a printing unit 1043, and a scanner unit, which are components of the printing apparatus 104. The operation unit 1042 includes a user interface, and is instructed to operate the printing apparatus 104 from the user. The printing unit 1043 performs various types of image processing and outputs an image under control of the control unit 1041. The scanner unit inputs an image under control of the control unit 1041.

The firewall 105 functions as a device for limiting access from the exterior via the Internet 101 to enhance security of the printing apparatus 104 regardless of whether it is hardware or software. Since the firewall 105 exists, the print server 103 itself cannot send data to the printing apparatus 104 as a starting point. When the printing apparatus 104 receives data at the firewall 105 from the print server 103, therefore, the firewall 105 needs to receive a response to the processing request from the printing apparatus 104.

The above-mentioned service will be described. The service includes a print service and a scan service. An example of the print service will be described in a first exemplary embodiment, as will be described in detail below. A user who desires to receive the print service instructs the print server 103 to receive a service to print a content, i.e., a print service via the web browser 4032 (FIG. 4) in the printing apparatus 104, described below. The print server 103, which has been so instructed, converts the content into a format printable by the printing apparatus 104 (this format is referred to as print data in the present exemplary embodiment). The print server 103 sends the print data to the printing apparatus 104. The printing apparatus 104 prints the print data. Thus, the user can receive the print service. A printing method includes a synchronous processing method and an asynchronous printing method, described below. In both the methods, the printing apparatus 104 issues the processing request, and receives data from the print server 103.

A system of various devices, including the document management server 102, the print server 103, and the printing apparatus 104, the collective of which provide a service to a user in cooperation, is referred to as a device cooperation system in the present exemplary embodiment. The user can receive a desired service by using the device cooperation system.

Figure 2:
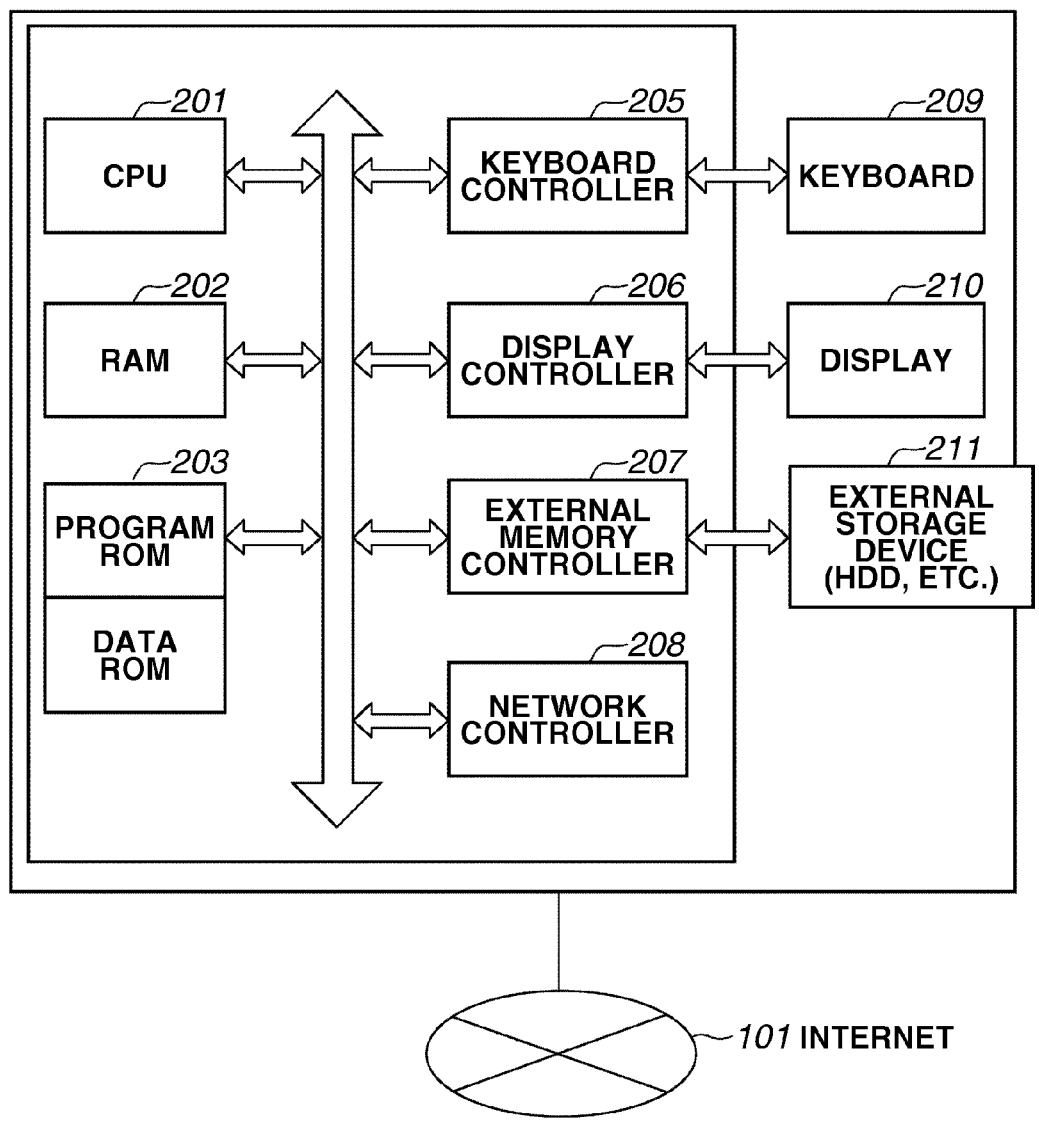
FIG. 2 illustrates a hardware configuration of a document management server and a print server in the first exemplary embodiment.

A hardware configuration of various devices constituting the device cooperation system in the first exemplary embodiment will be described below. FIG. 2 illustrates a hardware configuration of the document management server 102 and the print server 103 in the first exemplary embodiment. The hardware configuration illustrated in FIG. 2 corresponds to a hardware configuration of a general information processing apparatus. The hardware configuration of the general information processing apparatus is applicable to the document management service 102 and the print server 103 in the first exemplary embodiment.

A central processing unit (CPU) 201 functions to load a program stored in a read-only memory (ROM) 203 or an external storage device 211 into a random-access memory (RAM) 202 and execute the program. The program includes an operating system (OS) and an application. The control unit 1021 and the control unit 1031, described above, are implemented when the CPU 201 executes the program. Each process in a flowchart according to the first exemplary embodiment is carried out by functions implemented by the CPU 201 executing the program. The external storage device 211 also has a function of storing a document file.

The RAM 202 is a main memory of the CPU 201, and also functions as a work area. A keyboard controller 205 controls key input from a pointing device connected to a keyboard 209 or a general information processing apparatus, which is not illustrated in FIG. 2. A display controller 206 controls display on various displays 210. An external memory controller 207 controls data access in the external storage device 211 storing various types of data, e.g., a hard disk drive (HDD). The external storage device 211 corresponds to the storage units 1022 and 1032, respectively, in the document management server 102 and the print server 103. A network controller 208 is connected to the Internet 101, to perform control processing for communication with an external apparatus via a network.

Figure 3:
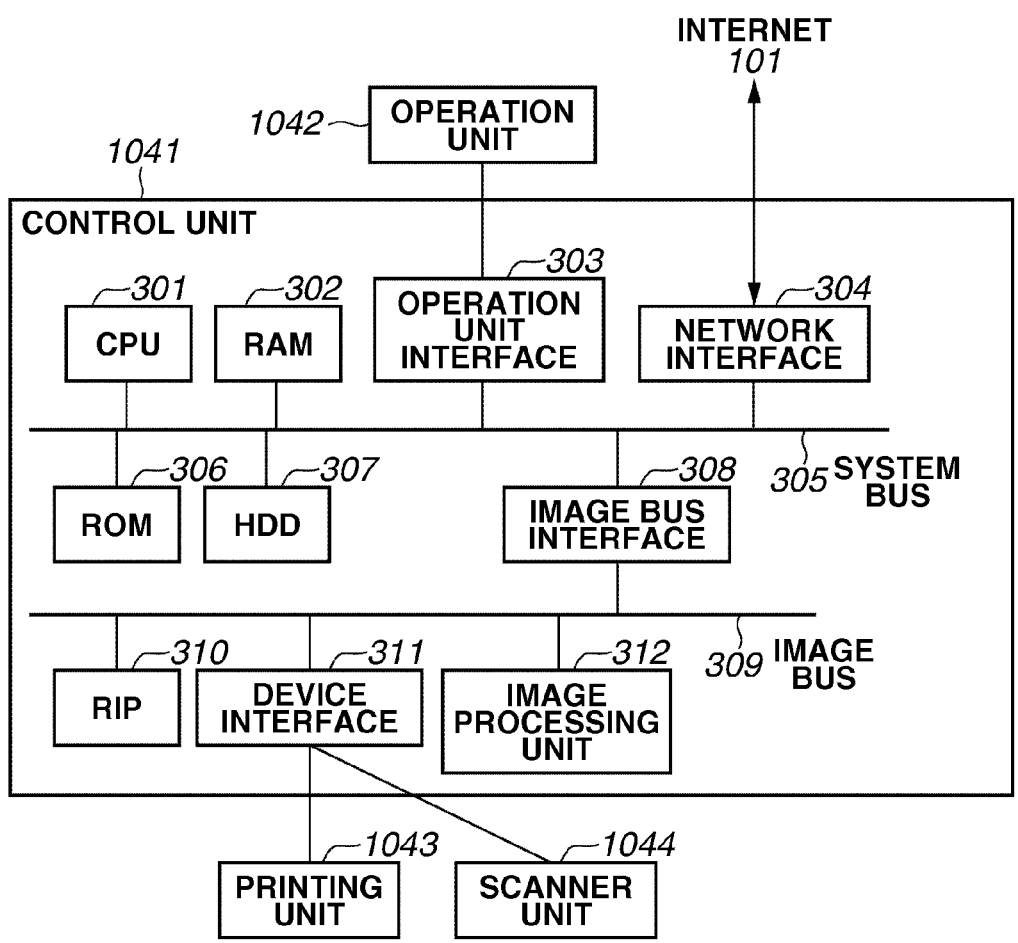
FIG. 3 illustrates a hardware configuration of a printing apparatus according to the first exemplary embodiment.

FIG. 3 illustrates a hardware configuration of the printing apparatus 104 constituting the device cooperation system according to the first exemplary embodiment. The printing apparatus 104 includes a control unit 1041 for controlling the printing apparatus 104. The control unit 1041 controls the printing unit 1043 serving as an image output device and the scanner unit serving as an image input device, and is connected to a local area network (LAN) and a public line to input and output image information or the like via the LAN and the public line.

The control unit 1041 includes a CPU 301. The CPU 301 is connected to a RAM 302, a ROM 306, a hard disk drive (HDD) 307, an image bus interface 308, an operation unit interface 303, and a network interface 304 via a system bus 305.

The RAM 302 functions as a main memory of the CPU 301, a work area, and an image memory for temporarily storing image data. The ROM 306 is a boot ROM storing a boot program for the printing apparatus 104. The hard disk drive (HDD) 307 functions as an external storage area storing system software, image data, and so on.

The operation unit interface 303 performs input and output to and from the operation unit 1042, and functions to output image data to be displayed on the operation unit 1042 to the operation unit 1042 and transmit information input via the operation unit 1042 by the user to the CPU 301, for example. The network interface 304 performs control processing for communication with an external apparatus connected via the Internet 101.

The image bus interface 308 functions as a bus bridge for connecting the system bus 305 and an image bus 309 to transfer image data at high speed and convert a data structure. The image bus 309 functions as a bus for performing communication among a raster image processor (RIP) 310, a device interface 311, an image processing unit 312, the printing unit 1043, and the scanner unit. The RIP 310 generates a raster image based on print data. The image processing unit 312 subjects the raster image to image processing such as halftone processing.

Figure 4:
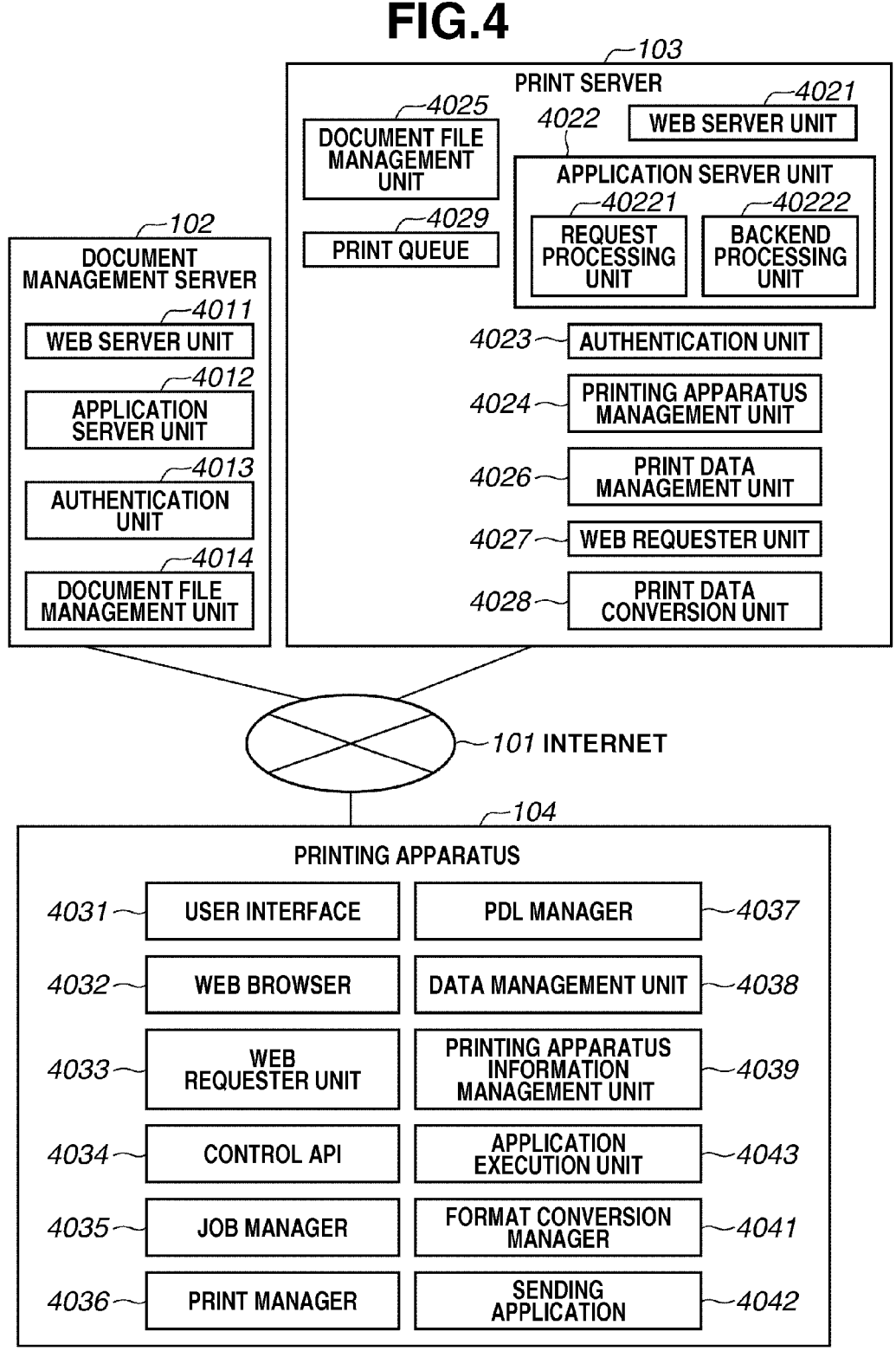
FIG. 4 illustrates a software configuration of a document management server, a print server, and a printing apparatus in the first exemplary embodiment.

A software configuration in the device cooperation system according to the first exemplary embodiment will be described below. FIG. 4 illustrates a software configuration of the document management server 102, the print server 103, and the printing apparatus 104, which constitute the device cooperation system according to the first exemplary embodiment.

The document management server 102 includes a web server unit 4011, an application server unit 4012, an authentication unit 4013, and a document file management unit 4014. Program files for implementing each of the units are stored in the storage unit 1022 (the external storage device 211). Various functions provided as a web application by the document management server 102 are implemented when the program files are read into the RAM 202 and executed by the CPU 201. The web server unit 4011 receives a hypertext transfer protocol (HTTP) request from a web requester unit 4027 in the print server 103, described below, via the Internet 101. The web server unit 4011 calls the application server unit 4012 when it receives the request, to perform processing in response to the request.

The application server unit 4012 corresponds to a business logic in the web application. The application server unit 4012 calls the document file management unit 4014, to perform processing such as registration, acquisition, search, and deletion of the document file stored in the storage unit 1022 and management processing of related information appended to the document file. The document file management unit 4014 performs processing such as storage, search, and deletion of the document file.

The authentication unit 4013 has a function of executing authentication processing. If the authentication has succeeded, the document management server 102 performs processing in response to the request based on authority of an authenticated user. If the authentication has failed, an authentication failure error is returned to a request source, to end the processing. A range in which functions of the printing management server 102 can be used is determined according to an authority level of the user based on the authority of the authenticated user. For example, a manager can use all the functions of the document management server 102, and a general user can use only some of the functions of the document management server 102. An authentication may be performed by any method. A content of specific processing performed by the document management server 102 in the first exemplary embodiment will be described in detail in the following flowchart.

The print server 103 includes a web server unit 4021, an application server unit 4022, an authentication unit 4023, a printing apparatus management unit 4024, a document file management unit 4025, a print data management unit 4026, the web requester unit 4027, and a print data conversion unit 4028. Program files for implementing each of the units are stored in the storage unit 1032 (the external storage device 211). Various functions provided as a web application by the document management server 102 are implemented when the program files are read into the RAM 202 and executed by the CPU 201.

The web server unit 4021 receives a HTTP request from a web requester unit 4033 in the printing apparatus 104, described below, via the Internet 101. The web server unit 4021 calls the application server unit 4022 when it receives the request, to perform processing in response to the request. The application server unit 4022 corresponds to a business logic in the web application, and calls the printing apparatus management unit 4024, the document file management unit 4025, the print data conversion unit 4028, and the print data management unit 4026, to generate an execution result. The application server unit 4022 includes a request processing unit 40221 for performing printing processing using a synchronous processing method, and a backend processing unit 40222 for performing printing processing using an asynchronous processing method.

The printing processing using the synchronous processing method and the printing processing using the asynchronous processing method will be described. The printing apparatus 104 provides a session in the print server 103 in response to a processing request (a printing instruction request) for a document file designated from the user. The print server 103 in which the session is provided remains in a session held state. The printing processing using the synchronous processing method means a method for performing output processing in response to the processing request, and when responding to the processing request, a notification is returned that the processing has been performed via the held session. The printing processing using the asynchronous processing method means a method for responding to a processing request from the printing apparatus 104 by returning a screen display response during output processing, performing the output processing in the background, and returning a notification that the processing has been performed in a stage where the output processing is completed. In the printing processing using the asynchronous processing method, when the print server 103 returns the notification that the processing has been performed, the printing apparatus 104 returns the notification via the provided session when it sends the processing request again.

The printing apparatus management unit 4024 manages a device capacity and a status of the printing apparatus 104. The print data management unit 4026 temporarily manages print data in the storage unit 1022. A print queue 4029 stores a processing request message (processing request) issued by the request processing unit 40221. The authentication unit 4023 has a function of performing authentication processing. When the web server unit 4021 in the print server 103 receives a processing request, the authentication unit 4023 performs authentication processing. If the authentication has succeeded, the print server 103 performs processing in response to the request based on authority of an authenticated user. If the authentication has failed, an authentication failure error is returned to a request source and the processing ends. A range in which functions of the print server 103 can be used is determined according to an authority level of the user based on the authority of the authenticated user. For example, a manager can use all the functions of the print server 103, and a general user can use only some of the functions of the print server 103. An authentication may be performed by any method. A content of specific processing performed by the print server 103 in the first exemplary embodiment will be described in detail in the following flowchart.

The request processing unit 40221, the backend processing unit 40222, and the print queue 4029 in the print server 103 will be described below. The request processing unit 40221 receives a request from the printing apparatus 104 via the web server unit 4021. In the printing processing using the synchronous processing method, the request processing unit 40221 performs the printing processing. On the other hand, in the printing processing using the asynchronous processing method, the request processing unit 40221 sends a processing request to the backend processing unit 40222 via the print queen 4029.

The backend processing unit 40222 acquires a processing request message stored in the print queue 4029 via the print queue 4029. The backend processing unit 40222 executes the processing request received from the request processing unit 40221 via the print queue 4029. The print queue 4029 provides a service for the request processing unit 40221 and the backend processing unit 40222 to asynchronously perform data communication. The request processing unit 40221 and the backend processing unit 40222 issue various instructions to the print queue 4029, to asynchronously perform data communication. An instruction issued to the print queue 4029 by the request processing unit 40221 includes an instruction to add and an instruction to delete a queue message. An instruction issued to the print queue 4029 by the backend processing unit 40222 includes an instruction to acquire a queue message and an instruction to change a status of the queue message.

In the printing processing using the asynchronous processing method, a series of operations for the request processing unit 40221 and the backend processing unit 40222 to asynchronously perform data communication will be described. The request processing unit 40221 generates a queue message (a processing request message) in response to the processing request from the printing apparatus 104, and sends an addition instruction to the print queue 4029 to add the queue message to the print queue 4029. The request processing unit 40221 writes "print data is being generated" as the status of the queue message in a management table (not illustrated). The request processing unit 40221 and the backend processing unit 40222 rewrite the status on the management table. As a result, the request processing unit 40221 can confirm a progress status of processing corresponding to the processing request from the printing apparatus 104. The print queue 4029, which has received the addition instruction from the request processing unit 40221, adds the queue message to the print queue 4029. The backend processing unit 40222 issues an acquisition instruction to the print queue 4029 to acquire the queue message. The backend processing unit 40222 changes the status of the queue message in the management table when the printing processing is completed. The status of the queue message in the management table is changed to "print data has been generated". If a virtual machine is mounted on the backend processing unit 40222, the number of backend processing units 40222 can also be increased or decreased. The backend processing unit 40222 issues an acquisition instruction to the print queue 4029 when it does not perform processing.

The printing apparatus 104 includes a user interface 4031, the web browser 4032, a sending application 4042, the web requester unit 4033, a control application programming interface (API) 4034, and a job manager 4035. The printing apparatus 104 further includes a print manager 4036, a procedure definition language (PDL) manager 4037, a data management unit 4038, a printing apparatus information management unit 4039, and an encryption management unit 4040. Program files for implementing each of the units are stored in the hard disk drive (HDD) 307. Various functions provided by the printing apparatus 104 are implemented when the program files are read into the RAM 302 and are executed by CPU 301.

The user interface 4031 has a function of mediating, when the user uses various functions provided by the printing apparatus 104, between the printing apparatus 104 and a user operation. The user interface 4031 transfers operation information to various programs, described below, according to the user operation input via the operation unit 1042. The web browser 4032 has a function of performing HTTP connection to the document management server 102 via the Internet 101 and performing various types of processing provided by the document management server 102. The web browser 4032 is displayed on the operation unit 1042 to receive input by the user. Information relating to the user operation input to the web browser 4032 is transferred to various programs, described below, in the printing apparatus 104 via the user interface 4031, as described above. The sending application 4042 has a function of sending image data input from the scanner unit to an external apparatus.

The web requester unit 4033 has a function of sending a web service request to the web server unit 4011 in the document management server 102 via the Internet 101 and receiving a response to the web service request. The control API 4034 functions as an interface for accessing the job manager 4035, the print manager 4036, and the PDL manager 4037 for the user interface 4031. The control API 4034 can reduce a dependence relationship among programs and enhance diversion of each program. The job manager 4035 has a function of interpreting various types of processing designated by the control API 4034 and giving instructions to the print manager 4036 and the PDL manager 4037. The job manager 4035 manages hardware processing to be performed by the printing apparatus 104 in an integrated fashion.

The print manager 4036 has a function of managing and controlling printing processing designated by the job manager 4035. The PDL manager 4037 has a function of subjecting print data designated by the job manager 4035 to PDL conversion. The application server unit 4012 also has functions of the print manager 4036 and the PDL manager 4037. The data management unit 4038 has a function of managing and controlling data stored in the HDD 307. The printing apparatus information management unit 4039 manages printing apparatus identification information relating to the printing apparatus 104, and installation location information relating to the printing apparatus 104 (including information such as an Internet Protocol (IP) address on a network).

A format conversion manager 4041 performs processing for converting scanned image data into a document file such as a portable document format (PDF) and processing for converting the document file into print data. An application execution unit 4043 has a function of performing some of the various types of processing of the web browser 4032, acting as a proxy.

Figure 5:
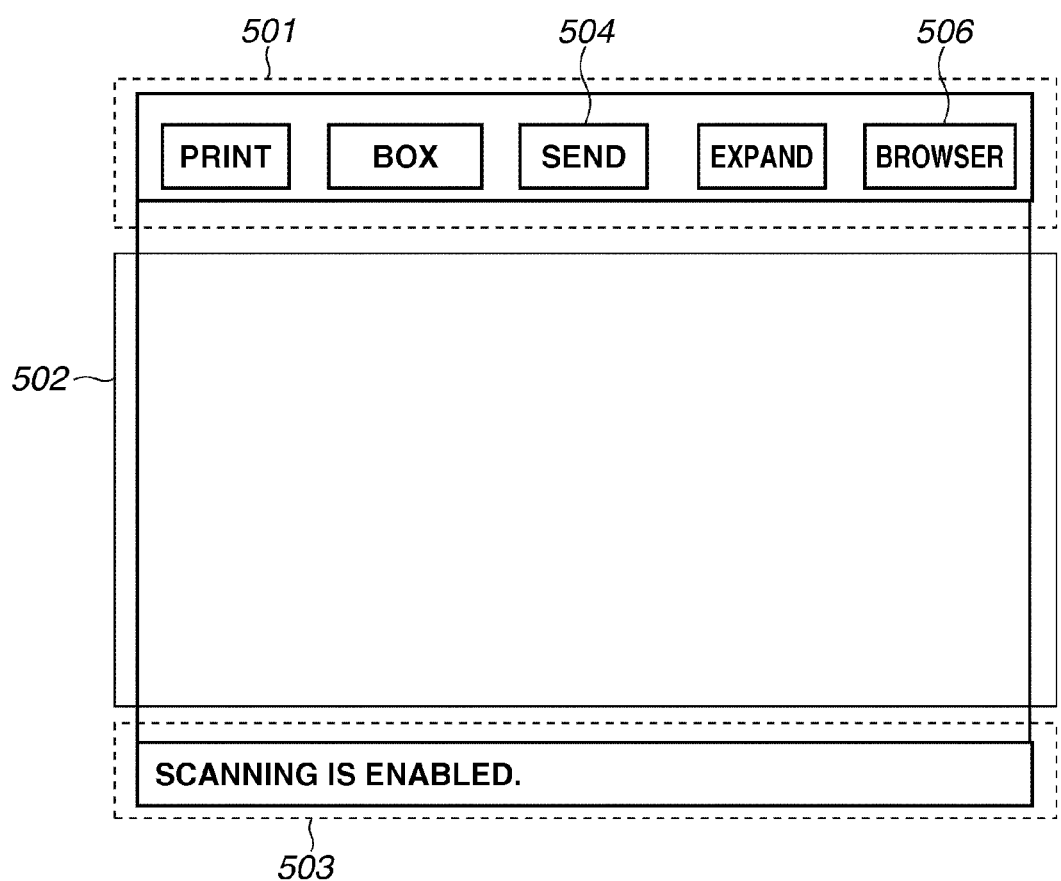
FIG. 5 illustrates an example of a screen of a user interface in the first exemplary embodiment.

The user interface 4031 will be described below. FIG. 5 illustrates an example of the user interface 4031 in the printing apparatus 104. On a program start area 501, buttons for starting the various programs in the device cooperation system are displayed to receive previously registered services. When a sending button 504 is pressed, the sending application 4042 is started to receive a sending service. When a browser button 505 is pressed, the web browser 4032 is started. On a program display area 502, a setting screen is displayed to perform setting for reflecting a user operation on a program started to receive a predetermined service. On a status display area 503, a status of the printing apparatus 104 is displayed.

Figure 6:
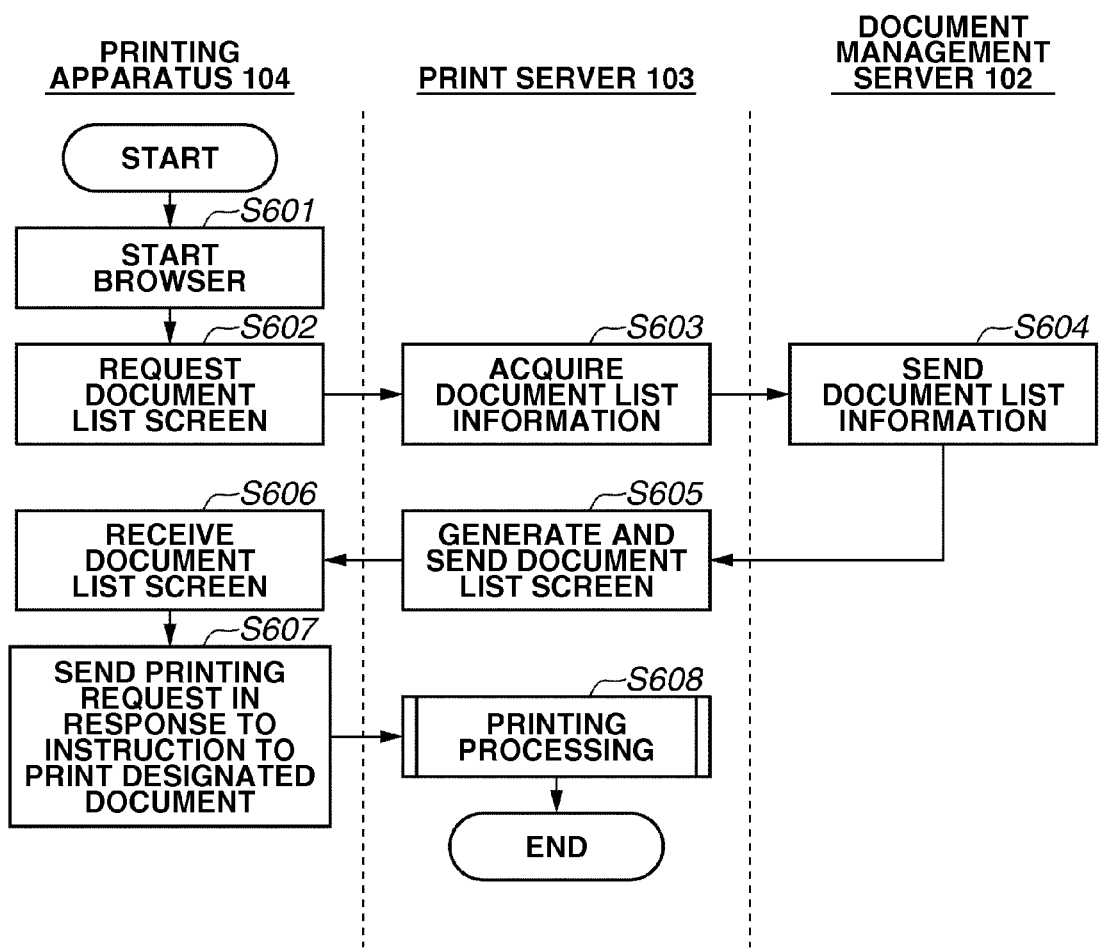
FIG. 6 is a flowchart illustrating processes performed until a printing apparatus starts a browser and issues a printing instruction in the first exemplary embodiment.

Processing for printing a document file according to the present exemplary embodiment will be described below. FIG. 6 is a flowchart illustrating processes performed until the printing apparatus 104 starts the web browser 4032 and issues a printing instruction.

In step S601, the CPU 301 in the printing apparatus 104 reads the web browser 4032 stored in the HDD 307 into the RAM 302. When the reading is completed, the CPU 301 in the printing apparatus 104 starts the web browser 4032, which has been read into the RAM 302, and displays the web browser 4032 on the operation unit 1042. In step S602, the CPU 301 in the printing apparatus 104 causes the web browser 4032 to make a request to acquire a document list screen. In step S603, the CPU 201 in the print server 103 causes the web server unit 4021 to send the request to acquire a document list information to the document management server 102, from the web requester unit 4027 in the print server 103 in response to the request to acquire the document list screen from the printing apparatus 104.

In step S604, the CPU 201 in the document management server 102 sends the document list information in response to the request from the print server 103 to acquire the document list information. In step S605, the CPU 201 in the print server 103 generates the document list screen based on the document list information acquired from the document management server 102 and document list information acquired from the document file management unit 4025, and sends the document list screen to the printing apparatus 104. In step S606, the CPU 301 in the printing apparatus 104 receives the received document list screen, and causes the web browser 4032 to display the document list screen on the operation unit 1042. In step S607, the CPU 301 in the printing apparatus 104 sends a printing request to the print server 103 in response to an instruction to print the document designated in the web browser 4032 by the user. In this case, a session is provided between the printing apparatus 104 and the print server 103 when the printing instruction, i.e., a processing request is sent. The print server 103 returns a response to the processing request to the printing apparatus 104 via the session. In step S608, the CPU 201 in the print server 103 performs printing processing. Details of the printing processing in step S608 will be described below.

Figure 7:
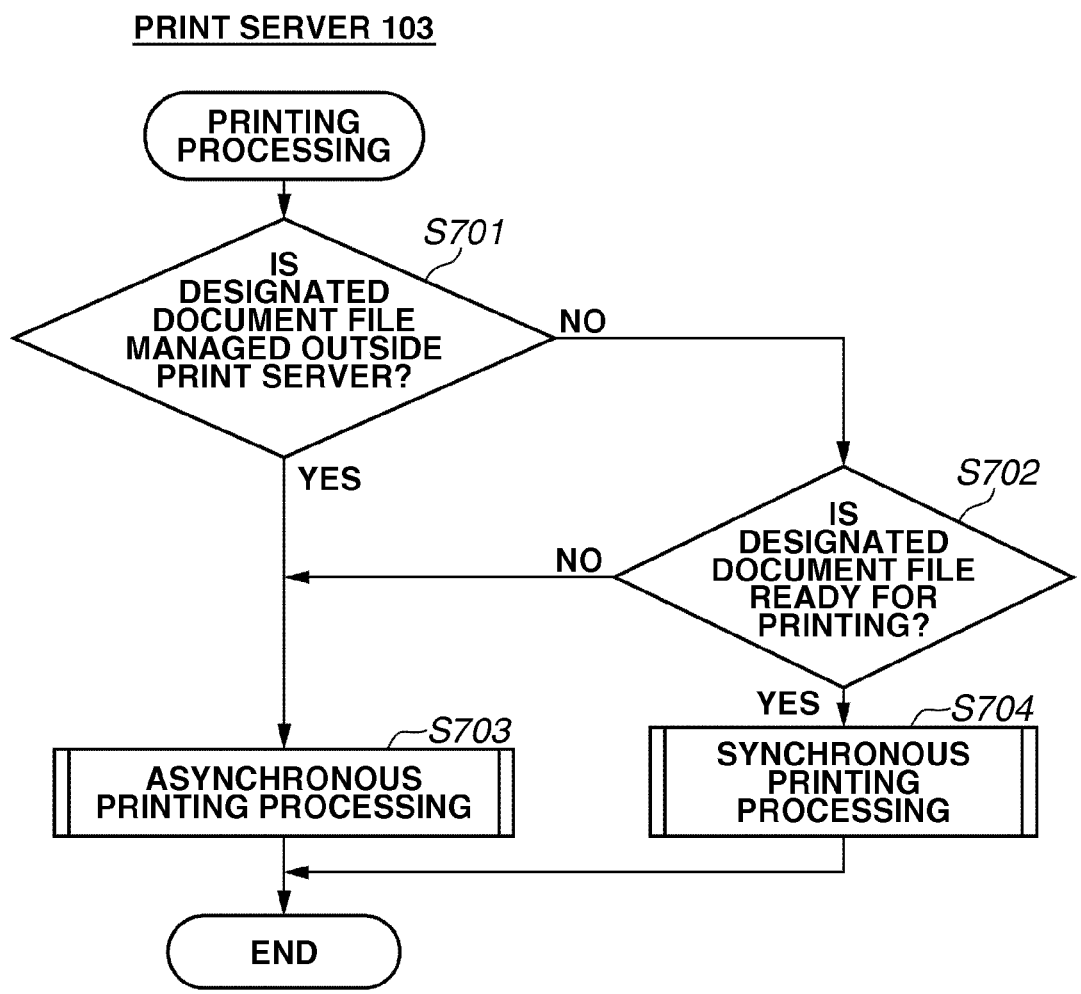
FIG. 7 is a flowchart illustrating processes for determining whether printing processing is performed using a synchronous processing method or using an asynchronous processing method in the first exemplary embodiment.

FIG. 7 is a flowchart illustrating processes for determining whether printing processing is performed using a synchronous processing method or using an asynchronous processing method in the printing processing in step S603 in the print server 103.

First, the application server unit 4022 in the print server 103 determines whether the document file management unit 4025 storing a document file belongs to the same domain as that to which the print server 103 belongs using a URI. For example, it is assumed that an address of the print server 103 is http://xxx.yyy.zz/aa, and an address of the document file management unit 4025 is http://xxx.yyy.zz/bb. In this case, the addresses are the same in a part, "xxx.yyy.zz". Accordingly, the application server unit 4022 specifies that the domain to which the document file management unit 4025 storing the document file belongs and the domain to which the print server 103 belongs are the same.

In step S701, the CPU 201 in the print server 103 causes the application server unit 4022 to determine whether a document file, which the printing apparatus 104 has been instructed to print, is managed by the document file management unit 4025 or by the document file management unit 4014. A management location is determined using a URI of a document storage location in a printing instruction request. If the document file is managed by the document file management unit 4025 in the print server 103, the processing proceeds to step S702. If the document file is managed by the document file management unit 4014 in the document management server 102, the processing proceeds to step S703. More specifically, point is that a management unit storing a document file exists in the same domain as that to which a processing unit for performing processing belongs.

In step S703, the CPU 201 in the print server 103 causes the backend processing unit 40222 to perform the printing processing using the asynchronous processing method. Details will be described with reference to the following flowchart. The printing processing is performed using the asynchronous processing method because the document file management unit 4025 belongs to a domain different from that to which the print server 103 belongs so that it takes much time for the print server 103 to acquire data from the document file management unit 4025.

In step S702, the CPU 201 in the print server 103 causes the application unit 4022 to determine whether a designated document file is ready for printing. The document file ready for printing, for example, a PDF, can be directly printed by the printing apparatus 104. The type of document file that can be directly printed differs for each printing apparatus. Information relating to the type of document file that can be directly printed for each printing apparatus is held in the printing apparatus management unit 4024. The application unit 4022 determines whether the document file is ready for printing based on request destination information relating to the printing apparatus 104, which has been instructed to perform printing, and the printing apparatus management unit 4024. More specifically, the application unit 4022 specifies whether the printing processing is performed using the synchronous processing method or using the asynchronous processing method depending on whether the document file is ready for printing.

The request destination information includes identification information relating to the designated document file. A file format of the document file can be inquired of the document management server 102 using the identification information.

The document management server 102 confirms a file format of a target document file based on the received identification information, and sends a confirmation result to the print server 103. If the document file is ready for printing (YES in step S702), the processing proceeds to step S704. If the document file is not ready for printing (NO in step S702), the processing proceeds to step S703. Thus in the first exemplary embodiment, either one of the synchronous processing method and the asynchronous processing method is determined based on information relating to the document file (a URI of the document file).

In step S704, the CPU 201 in the print server 103 causes the request processing unit 40221 to perform the printing processing using the synchronous processing method. Details will be described in the following flowchart. There are two reasons why the printing processing is performed using the synchronous processing method. The first reason is that it takes hardly any time for the print server 103 to acquire the document file because the document file management unit 4025 storing the document file belongs to the same domain as that to which the print server 103 belongs. The other reason is that no time is required to convert the acquired document file because the printing apparatus 104 can print the document file without subjecting the document file to conversion processing.

Figure 8:
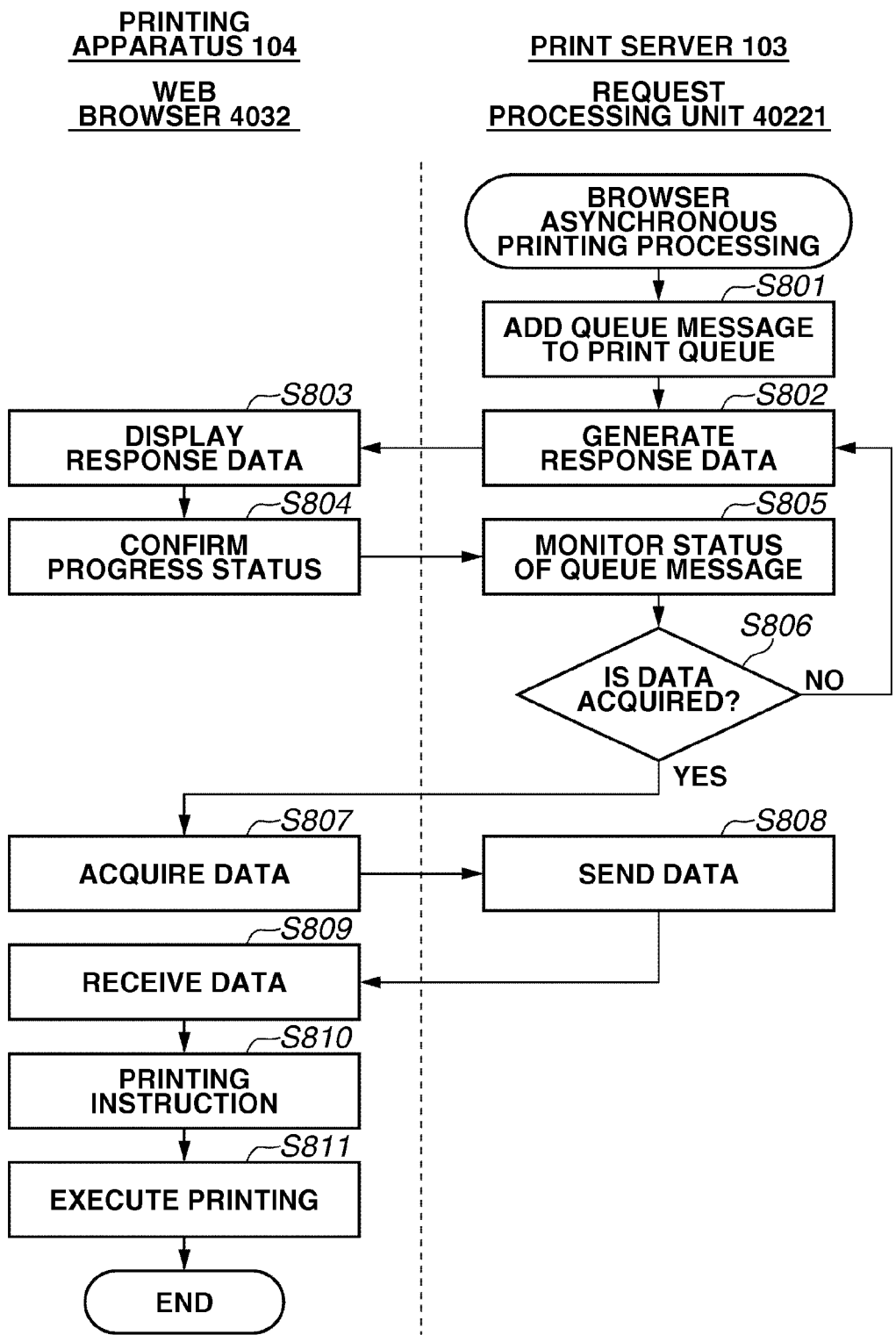
FIG. 8 is a flowchart illustrating printing processing using an asynchronous processing method in the first exemplary embodiment.

FIG. 8 is a flowchart illustrating the printing processing using the asynchronous processing method in step S703. Particularly, FIG. 8 is a flowchart illustrating exchange between the printing apparatus 104 and the print server 103. The request processing unit 40221 and the backend processing unit 40222 perform processing corresponding to the processing request from the printing apparatus 104 as follows.

In step S801, the CPU 201 in the print server 103 causes the request processing unit 40221 to add a queue message to the print queue 4029. At this time, information relating to the newly added queue message is written on the management table, and the status of the queue message is "print data has not been processed yet". In step S802, the CPU 201 in the print server 103 causes the web server unit 4021 to generate a screen being processed as response data, and send the response data to the printing apparatus 104. In this case, the screen is returned to the printing apparatus 104 via the session provided when the printing apparatus 104 makes an output request. If the processing proceeds to step S802 via step S806, however, response data is generated for the web browser 4032 to confirm the progress status again.

In step S803, the CPU 301 in the printing apparatus 104 causes the web browser 4032 to display the received response data serving as the screen being processed on the operation unit 1042. In step S804, the CPU 301 in the printing apparatus 104 causes the web browser 4032 to request the print server 103 to confirm the progress status. The request to confirm the progress status is previously written in the response data in the print server 103, and is made using a timer for each predetermined period as a trigger. The above-mentioned processing can be implemented by writing the response data in Java (registered trademark) Script. The web browser 4032 sends a request to confirm the progress status again in response to the response data.

In step S805, the CPU 201 in the print server 103 causes the request processing unit 40221 to confirm the management table that manages the status of the queue message in the print queue 4029. If the status is "print data is being generated", the processing proceeds to step S802. If the status is "print data has been generated", the processing proceeds to step S806. In step S5806, the CPU 201 in the print server 103 causes the web server unit 4021 to generate and send response data for acquiring print data. When the sending is completed, the request processing unit 40221 instructs the print queue 4029 to delete a corresponding queue message. The print queue 4029 deletes the queue message. In step S807, the CPU 301 in the printing apparatus 104 causes the web browser 4032 to acquire print data. In step S808, the CPU 201 in the print server 103 causes the web server unit 4021 to send the print data. In step S809, the CPU 301 in the printing apparatus 104 causes the web browser 4032 to acquire data. In step S810, the CPU 301 in the printing apparatus 104 issues an instruction to print the acquired document file. In step S811, the CPU 301 in the printing apparatus 104 performs printing.

Figure 9:
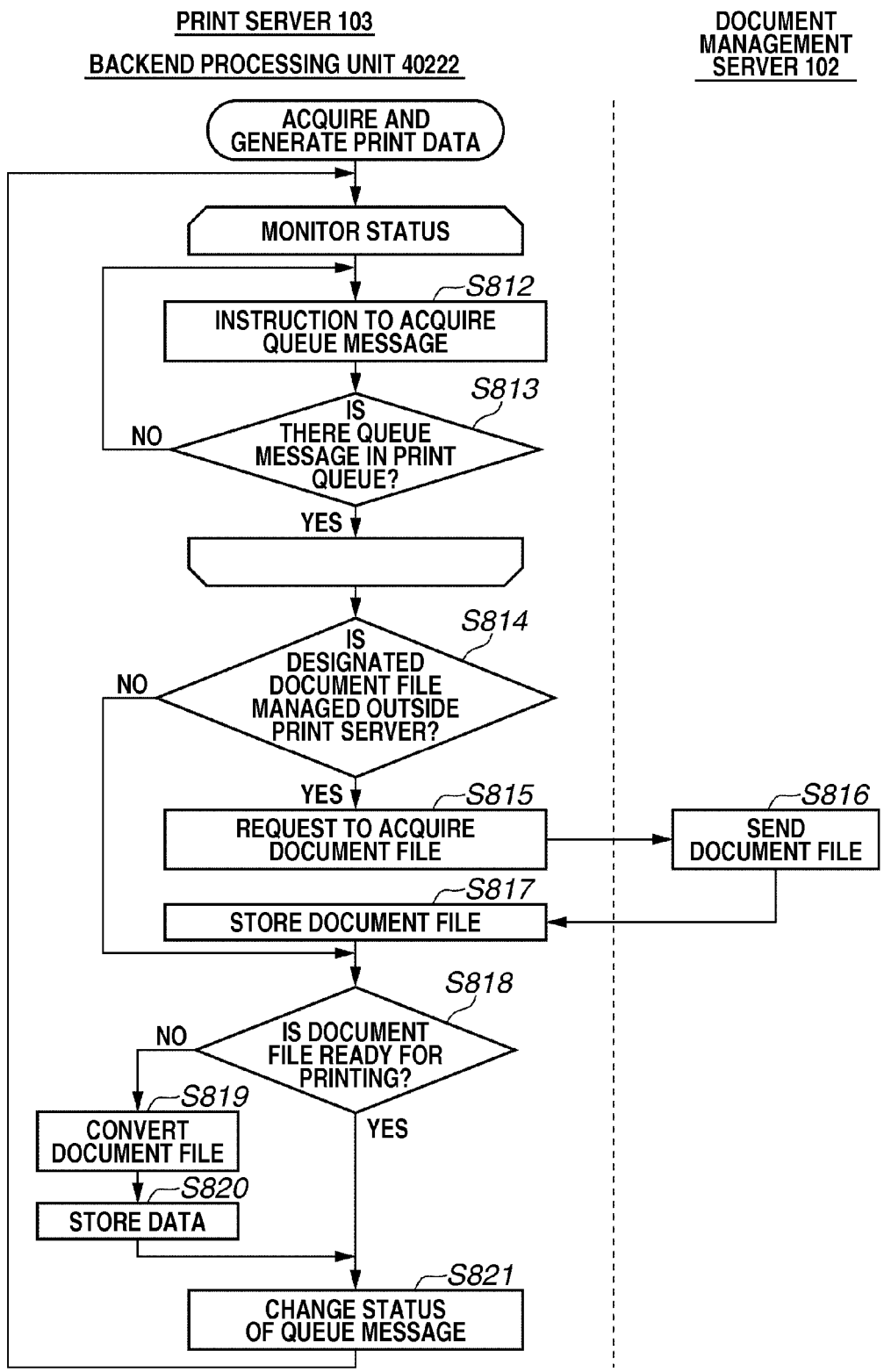
FIG. 9 is a flowchart illustrating an asynchronous processing method in a print server in the first exemplary embodiment.

FIG. 9 is a flowchart illustrating exchange of data for asynchronously acquiring and generating print data by the backend processing unit 40222 in the print server 103. In step S812, the CPU 201 in the print server 103 causes the backend processing unit 40222 to issue an instruction to acquire a queue message in the print queue 4029. In step S813, the CPU 201 in the print server 103 causes the backend processing unit 40222 to determine whether there is a queue message in the print queue 4029. If there is a queue message in the print queue 4029 (YES in step S813), the processing proceeds to step S814. If there is no queue message in the print queue 4029 (NO in step S813), the processing proceeds to step S812. When the processing proceeds to step S814, the status of the queue message in the management table corresponding to the acquired queue message is changed to "print data is being generated".

In step S814, the CPU 201 in the print server 103 causes the backend processing unit 40222 to determine whether the document file, which the printing apparatus 104 has been instructed to print, is managed by the document file management unit 4025 in the print server 103 or by the document file management unit 4014 in the document management server 102. If the document file is managed by the document file management unit 4025 in the print server 103, the processing proceeds to step S818. If the document file is managed by the document file management unit 4014 in the document management server 102, the processing proceeds to step S815. When the processing proceeds to step S818, the request processing unit 40221 acquires a document file stored in the print data management unit 4026.

In step S815, the CPU 201 in the print server 103 causes the backend processing unit 40222 to request the document management server 102 to acquire a document file from the web requester unit 4027. In step S816, the CPU 201 in the document management server 102 sends the document file to the print server 103.

In step S817, the CPU 201 in the print server 103 causes the backend processing unit 40222 to store the acquired document file in the document file management unit 4025. In step S818, the CPU 201 in the print server 103 causes the backend processing unit 40222 to determine whether the document file is ready for printing. If the document file is ready for printing (YES in step S818), the processing proceeds to step S821. If the document file is not ready for printing (NO in step S818), the processing proceeds to step S819.

In step S819, the CPU 201 in the print server 103 causes the backend processing unit 40222 to use the print data conversion unit 4028 to convert the document file into print data. In step S820, the CPU 201 in the print server 103 causes the backend processing unit 40222 to store the print data in the print data management unit 4026. In step S821, the CPU 201 in the print server 103 causes the backend processing unit 40222 to change the status of the queue message in the management table corresponding to the processed queue message to "print data has been generated".

Figure 10:
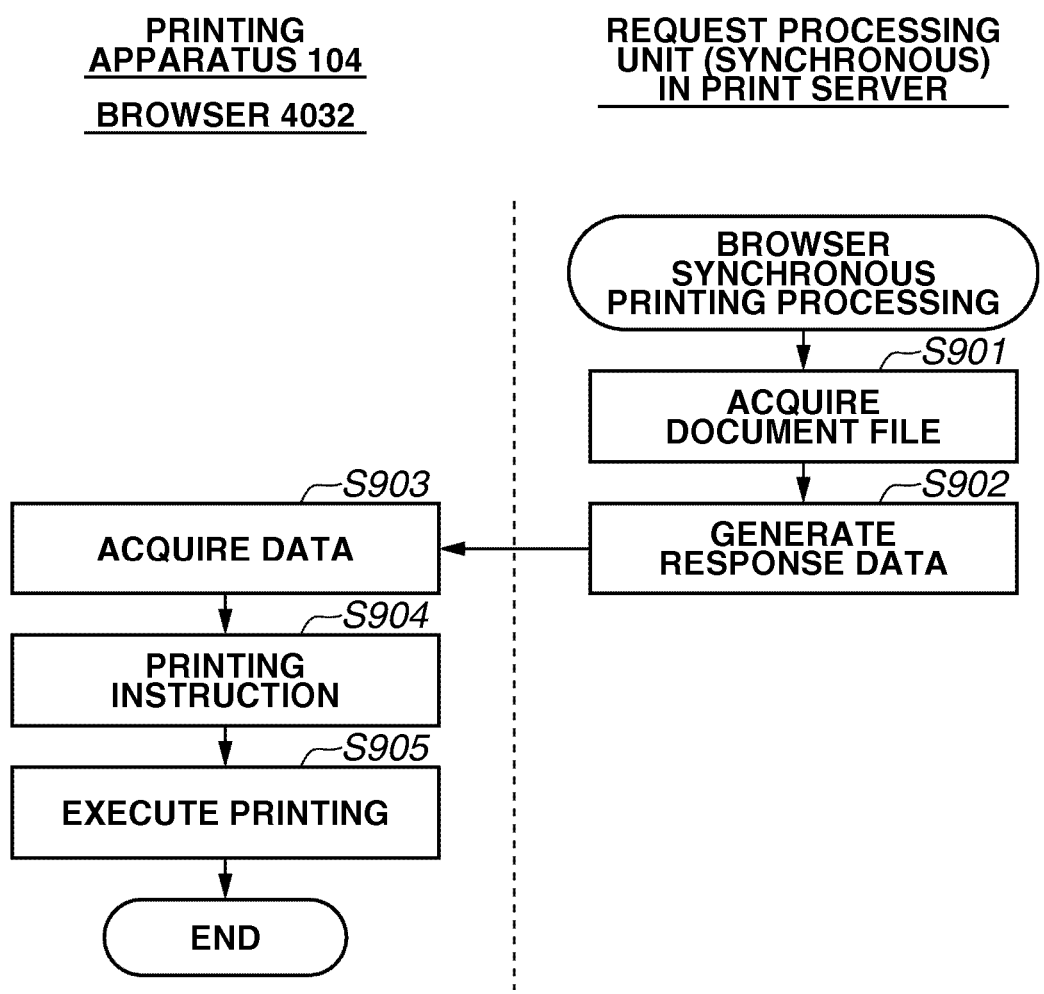
FIG. 10 is a flowchart illustrating printing processing using a synchronous processing method in step S704 in the first exemplary embodiment.

FIG. 10 is a flowchart illustrating the printing processing using the synchronous processing method in step S704. In step S901, the CPU 201 in the print server 103 causes the request processing unit 40221 to perform processing corresponding to the processing request from the printing apparatus 104. More specifically, the request processing unit 40221 performs processing for acquiring a document file from the document file management unit 4025. In step S902, the CPU 201 in the print server 103 causes the web server unit 4021 to generate response data. A storage location of the acquired document file is written in the response data.

In step S903, the CPU 301 in the printing apparatus 104 causes the web browser 4032 to acquire data based on the response data. In step S904, the CPU 301 in the printing apparatus 104 issues an instruction to print the acquired document file. In step S905, the CPU 301 in the printing apparatus 104 performs printing. Further, there is a method using a locale of a storage location of a document file as a criterion for determining whether the printing processing is performed using the synchronous processing method or using the asynchronous processing method. The synchronous printing processing and the asynchronous printing processing may be performed, respectively, when the locale is near and when the locale is far. Further, the synchronous printing processing and the asynchronous printing processing may be performed, respectively, when printing can be immediately performed and when printing cannot be immediately performed, depending on the status of the printing apparatus 104. The printing apparatus 104, which has acquired the response data in which the storage location is written, acquires a document from the document management server 102.

As described above, the print server 103 determines whether the printing processing is performed using the synchronous processing method or using the asynchronous processing method depending on a characteristic of the document file that the printing apparatus 104 has been instructed to print and changes the processing method accordingly. This can avoid unnecessarily making a request from the printing apparatus 104 to the print server 103 to confirm the status, so that a load on the print server 103 can be reduced. Further, the problem that a screen of the operation unit 1042 in the printing apparatus 104 looks frozen until a response to the printing apparatus 104 returns from the print server 103 is solved so that user operability in the printing apparatus 104 can be improved.

A method for confirming a progress status of an output request with a print server 103 using a web browser 4032 and an application execution unit 4043 in a printing apparatus 104 will be described below. A system configuration is similar to that in the first exemplary embodiment. Processing for printing a document file according to a second exemplary embodiment will be described below. Processes performed from start of the web browser 4032 in the printing apparatus 104 to issuance of a printing instruction is similar to those in the flow from step S601 to step S609.

Figure 11:
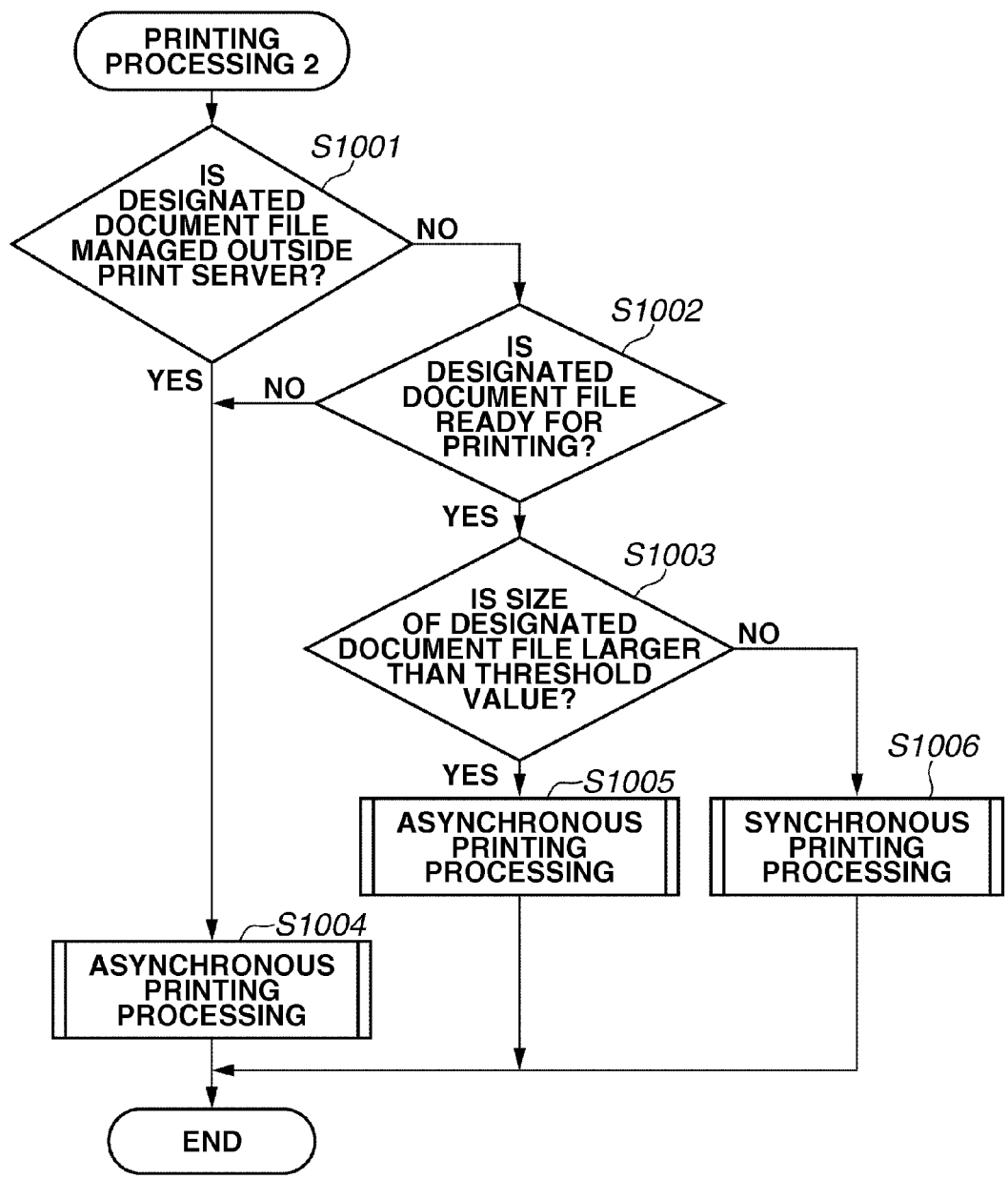
FIG. 11 is a flowchart illustrating processes for determining whether printing processing is performed using a synchronous processing method or using an asynchronous processing method in a second exemplary embodiment.

FIG. 11 is a flowchart illustrating processes for determining whether printing processing is performed using a synchronous processing method or using an asynchronous processing method in printing processing in step S603 in the print server 103.

In step S1001, the CPU 201 in the print server 103 causes an application server unit 4022 to determine whether a document file, which the printing apparatus 104 has been instructed to print, is managed by a document file management unit 4025 in the print server 103 or by a document file management unit 4014 in a document management server 102. A management location is determined using a URI of a document storage location in a printing instruction request. If the document is managed by the document file management unit 4025 in the print server 103, the processing proceeds to step S1002. If the document is managed by the document file management unit 4014 in the document management server 102, the processing proceeds to step S1004.

In step S1002, the CPU 201 in the print server 103 causes the application unit 4022 to determine whether a designated document file is ready for printing. The document file ready for printing means a document file that can be directly printed by the printing apparatus 104, for example, a PDF. A type of the document file that can be directly printed differs for each printing apparatus. Information relating to the type of document file that can be directly printed for each printing apparatus is held in the printing apparatus management unit 4024. The application unit 4022 determines whether the document file is ready for printing based on request destination information relating to the printing apparatus 104, which has been instructed to perform printing, and the printing apparatus management unit 4024. If the document file is ready for printing (YES in step S1002), the processing proceeds to step S1003. If the document file is not ready for printing (NO in step S1002), the processing proceeds to step S1004.

In step S1003, the CPU 201 in the print server 103 causes the application unit 4022 to determine whether the file size of the designated document file is larger than a threshold value. If the file size is larger than the threshold value (YES in step S1003), the processing proceeds to step S1005. In step S1005, the CPU 201 in the print server 103 specifies the asynchronous processing method. If the file size is smaller than the threshold value (NO in step S1003), the processing proceeds to step S1006. In step S1006, the CPU 201 in the print server 103 specifies synchronous processing method. The threshold value is set in advance by a manager of the print server 103. When the file size is larger than the threshold value, asynchronous processing is performed so that the web browser 4032 in the printing apparatus 104 can be opened, and a user can use the web browser 4032. When synchronous processing is performed, the web browser 4032 does not accept an execution instruction from the user because it is occupied by acquisition processing. As a result, it seems to the user that a screen of the browser 4032 is frozen.

In step S1004, the CPU 201 in the print server 103 causes a backend processing unit 40222 to perform the printing processing using the asynchronous processing method. Details will be described in the following flowchart. In step S1005, the CPU 201 in the print server 103 causes a request processing unit 40221 to perform the printing processing using the asynchronous processing method. Details will be described in the following flowchart. In step S1006, the CPU 201 in the print server 103 causes the request processing unit 40221 to perform the printing processing using the synchronous processing method. The processes are similar to those in step S901 to S905.

Figure 12:
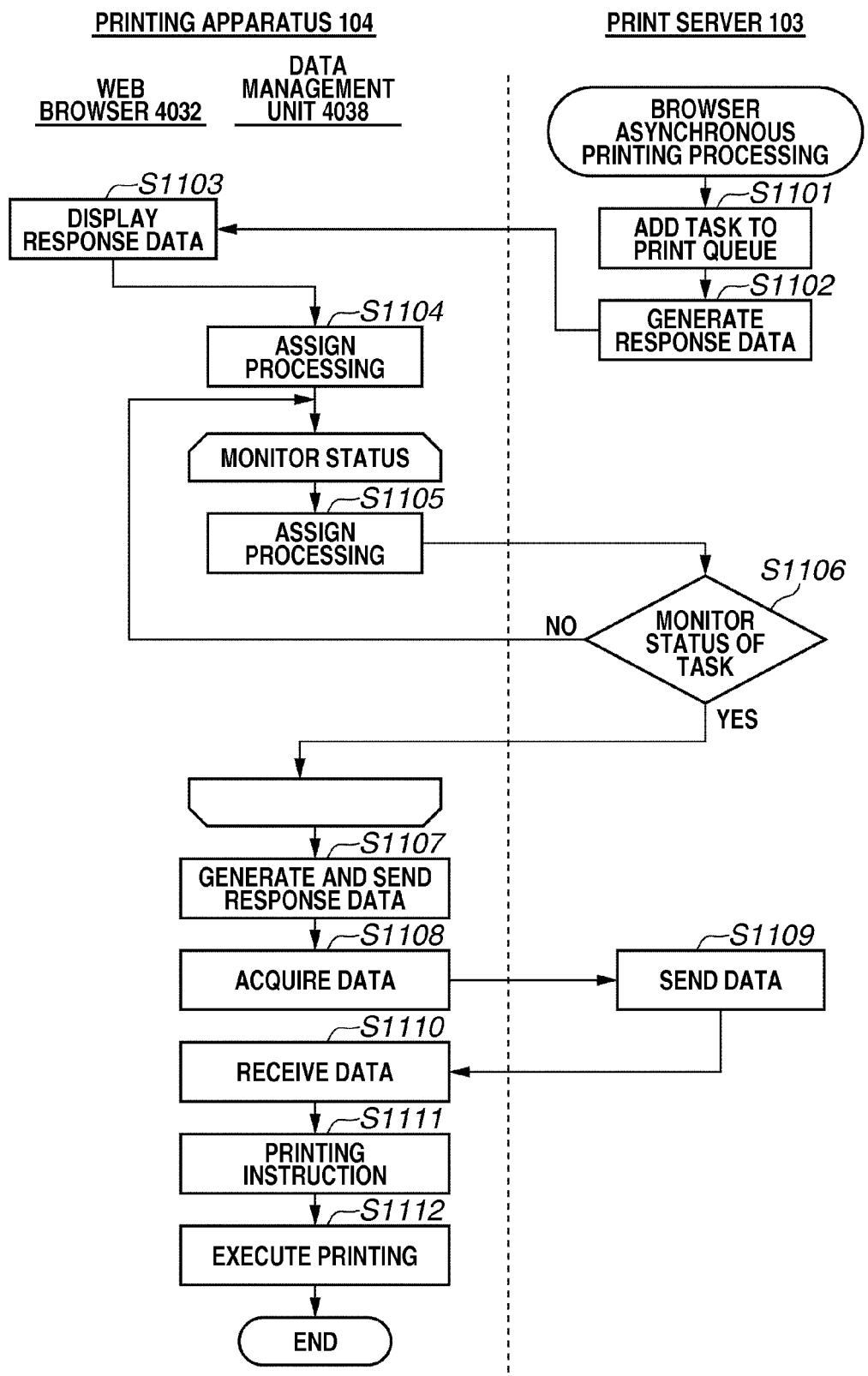
FIG. 12 is a flowchart illustrating exchange between a printing apparatus and a print server in printing processing using an asynchronous processing method in step S1004 in the second exemplary embodiment.

FIG. 12 is a flowchart illustrating exchange of data between the printing apparatus 104 and the print server 103 in the printing processing using the asynchronous processing method in step S1004. A method for asynchronously generating print data by the backend processing unit 40222 in the print server 103 is similar to that illustrated in FIG. 9.

In step S1101, the CPU 201 in the print server 103 causes the request processing unit 40221 to register a task in a print queue 4029. A status of a task in a management table at this time is "print data is being generated". In step S1102, the CPU 201 in the print server 103 causes the web server unit 4021 to generate response data serving as a screen being processed, and send the generated response data to the printing apparatus 104. In step S1103, the CPU 301 in the printing apparatus 104 causes the web browser 4032 to display the received response data serving as the screen being processed on an operation unit 1042.

In step S1104, the CPU 301 in the printing apparatus 104 causes the web browser 4032 to assign the processing to the application execution unit 4043. More specifically, the web browser 4032 confirms the progress status of the output request by the print server 103, and also takes charge of acquiring data. Thus, the web browser 4032 is opened so that the user can operate the web browser 4032. In step S1105, the CPU 301 in the printing apparatus 104 causes the application execution unit 4043 to request the print server 103 to confirm the progress status. In step S1106, the CPU 201 in the print server 103 causes the request processing unit 40221 to monitor the status of the task in the management table corresponding to the task in the print queue 4029. If the status is "print data is being generated", the processing proceeds to step S1105. If the status is "print data has been generated", the processing proceeds to step S1107

In step S1107, the CPU 301 in the printing apparatus 104 causes the application execution unit 4043 to generate response data for acquiring print data, and send the generated response data. In step S1108, the CPU 301 in the printing apparatus 104 causes the application execution unit 4043 to acquire the print data. In step S1109, the CPU 201 in the print server 103 causes the web server unit 4021 to send the print data. In step S1110, the CPU 301 in the printing apparatus 104 causes the application execution unit 4043 to acquire the print data. In step S1111, the CPU 301 in the printing apparatus 104 issues an instruction to print an acquired document file. In step S1112, the CPU 301 in the printing apparatus 104 performs printing.

In the synchronous processing, it takes hardly any time to acquire the document file. Therefore, the printing apparatus 104 and the print server 103 perform the flow illustrated in FIG. 10.

As described above, when it takes much time to acquire the document file, the processing performed by the web browser 4032 in the printing apparatus 104 is assigned to the application execution unit 4043 so that a problem of occupation of the operation unit 1042 can be solved and user operability can be improved.

Other Embodiments

Aspects can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium). In an example, a computer-readable medium may store a program that causes an apparatus or system to perform a method described herein. In another example, a central processing unit (CPU) may be configured to control at least one unit utilized in a method, apparatus, system, etc. described herein.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-156924 filed Jul. 9, 2010, which is hereby incorporated by reference herein in its entirety.

What is claimed is:

1. A processing system including a server group connectable to an image forming apparatus, the processing system comprising:
 a receiving unit configured to receive a processing request from the image forming apparatus and to receive information relating to a document file corresponding to the processing request from the image forming apparatus;
 a request processing unit configured to perform processing based on the processing request using a synchronous processing method;
 a backend processing unit configured to perform processing based on the processing request using an asynchronous processing method, wherein the synchronous processing method takes less time to complete than the asynchronous processing method;
 a determination unit configured to determine, based on the information relating to the document file received by the receiving unit, whether to specify, as a processing method, one of the synchronous processing method and the asynchronous processing method,
 wherein, in response to the determination unit determining to specify the synchronous processing method, the request processing unit processes the document file based on the processing request and,
 wherein, in response to the determination unit determining to specify the asynchronous processing method, the request processing unit sends a notification to the image forming apparatus that the processing request is being processed and the request processing unit requests the backend processing unit to process the processing request, wherein the backend processing unit receives the processing request from the request processing unit and processes the document file based on the processing request; and
 a sending unit configured to send, to the image forming apparatus and after one of the request processing unit and the backend processing unit has processed the document file according to the processing method determined by the determination unit, a notification that the document file has been processed.

2. The processing system according to claim 1, wherein the determination unit further is configured to determine whether a data management unit storing the document file belongs to a same domain as that to which the processing system belongs based on the information relating to the document file received by the receiving unit,
 wherein, in response to the determination unit determining that the data management unit does not belong to the same domain as that to which the processing system belongs, the determination unit determines to employ the asynchronous processing method.

3. The processing system according to claim 2, wherein, in response to the determination unit determining that the data management unit belongs to the same domain as that to which the processing system belongs, the determination unit further is configured to determine whether the document file is in a format directly printable by the image forming apparatus based on both the information relating to the document file received by the receiving unit and information relating to the image forming apparatus,
 wherein, in response to the determination unit determining that the document file is in a format directly printable by the image forming apparatus, the determination unit determines to employ the synchronous processing method, and wherein, in response to the determination unit determining that the document file is not in a format directly printable by the image forming apparatus, the determination unit determines to employ the asynchronous processing method.

4. The processing system according to claim 2, wherein, in response to the determination unit determining that the data management unit belongs to the same domain as that to which the processing system belongs and determining that the document file is in a format directly printable by the image forming apparatus, the determination unit further is configured to determine a file size of the document file exceeds a predetermined threshold value based on the information relating to the document file received by the receiving unit, wherein, in response to the determination unit determining that the file size of the document file does not exceed the predetermined threshold value, the determination unit determines to employ the synchronous processing method, and wherein, in response to the determination unit determining that the file size of the document file exceeds the predetermined threshold value, the determination unit determines to employ the asynchronous processing method.

5. The processing system according to claim 1, wherein, during output processing in a same output request session, the request processing unit sends the notification to the image forming apparatus that the processing request is being processed according to an asynchronous processing method by returning a screen display response to the image forming apparatus to change a screen of an application whereby it does not seem to a user of the image forming apparatus that the screen receiving the screen display is frozen.

6. The processing system according to claim 5, wherein, during output processing in a same session, the request processing unit generates response data and data based on the response data then is sent to the image forming apparatus without a notification being sent to the image forming apparatus that the processing request is being processed according to a synchronous processing method.

7. The processing system according to claim 1, further comprising:

a print queue configured to provide a service to asynchronously perform data communications, wherein the backend processing unit receives the processing request from the request processing unit via the print queue.

8. A method to control a processing system including a server group connectable to an image forming apparatus, wherein the processing system includes a request processing unit configured to perform processing based on the processing request using a synchronous processing method, and a backend processing unit configured to perform processing based on the processing request using an asynchronous processing method, wherein the synchronous processing method takes less time to complete than the asynchronous processing method, the method comprising:

receiving a processing request from the image forming apparatus and information relating to a document file corresponding to the processing request from the image forming apparatus;

determining, based on the received information relating to the document file, whether to specify, as a processing method, one of the synchronous processing method and the asynchronous processing method, wherein, in response to determining to specify the synchronous processing method, the request processing unit processes the document file based on the processing request, and wherein, in response to determining to specify the asynchronous processing method, the request processing unit sends a notification to the image forming apparatus that the processing request is being processed and the request processing unit requests the backend processing unit to process the processing request, wherein the backend processing unit receives the processing request from the request processing unit and processes the document file based on the processing request; and sending, to the image forming apparatus and after one of the request processing unit and the backend processing unit has processed the document file according to the determined processing method, a notification that the document file has been processed.

9. A non-transitory computer-readable medium storing a program that causes a processing system to perform the method according to claim 8.

10. A control method for controlling an image forming system that includes an image forming apparatus and a processing system having a server group, the control method comprising:

providing, from the image forming apparatus, a session with the processing system in response to a request to process a document file designated from a user by sending the request to process the document file to the processing system;

holding, in the processing system, the session by receiving the processing request sent by the image forming apparatus and performing processing based on the processing request, wherein the processing system includes a request processing unit configured to perform processing based on the processing request using a synchronous processing method, and a backend processing unit configured to perform processing based on the processing request using an asynchronous processing method, wherein the synchronous processing method takes less time to complete than the asynchronous processing method;

determining, in the processing system, whether to specify, as a processing method, one of the synchronous processing method and the asynchronous processing method, wherein, in response to determining to specify the synchronous processing method, the request processing unit processes the document file based on the processing request and, wherein, in response to determining to specify the asynchronous processing method, the request processing unit sends a notification to the image forming apparatus that the processing request is being processed and the request processing unit requests the backend processing unit to process the processing request, wherein the backend processing unit receives the processing request from the request processing unit and processes the document file based on the processing request; and sending, from the processing system, a notification, wherein, in response to determining to specify the synchronous processing method, sending includes sending a notification to the image forming apparatus that the request processing unit has processed the document file via the held session and, wherein, in response to determining to specify the asynchronous processing method, sending includes sending a notification to the image forming apparatus that the document file has been processed via a session provided when a processing request sent again is made; and acquiring, in the image forming apparatus, the document file in response to the image forming apparatus receiving a notification that the document file has been processed.

11. A non-transitory computer-readable medium storing a program that causes an image forming system to perform the control method according to claim 10.

* * * * *